Jan. 5, 1971  H. VOETEN  3,553,537
ELECTRIC COMPONENT FOR USE WITH PRINTED WIRING
Filed Feb. 4, 1969  2 Sheets-Sheet 1

INVENTOR.
HENDRIK VOETEN
BY
AGENT

United States Patent Office 3,553,537
Patented Jan. 5, 1971

3,553,537
ELECTRIC COMPONENT FOR USE WITH PRINTED WIRING
Hendrik Voeten, Centuurbaan, Zwolle, Netherlands, assignor to U.S. Philips Corporation, New York, N.Y., a corporation of Delaware
Filed Feb. 4, 1969, Ser. No. 796,421
Claims priority, application Netherlands, Feb. 9, 1968, 6801827
Int. Cl. H01g 1/02
U.S. Cl. 317—230      9 Claims

ABSTRACT OF THE DISCLOSURE

Electric component suitable for being mounted to printed wiring, in which a circuit element, particularly an electrolytic capacitor is accommodated in a unilaterally open recess of a synthetic resin body, covered by the bottom of a box slipped on the body and clamping around it. The body includes, parallel to its sidewall, current supply pins, one end of solderable metal of which projected outwardly, whereas the other end of film-forming metal is connected to the electrolytic capacitor.

---

Figure 1:
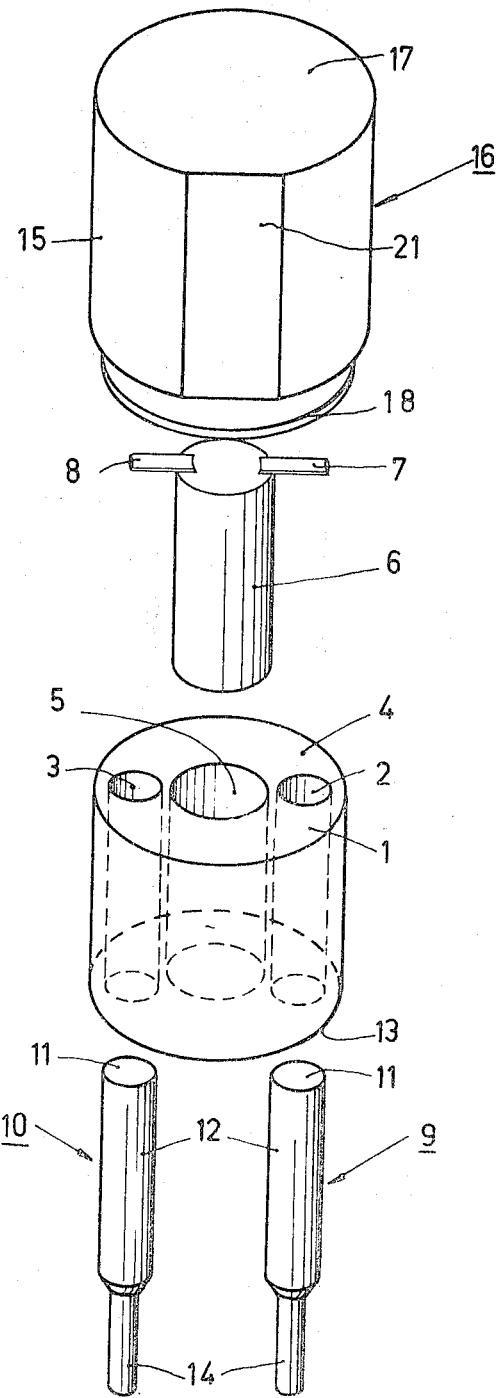

The invention relates to an electric component suitable for being mounted on printed wiring, said component being provided with a synthetic resin casing, a sidewall of which accommodates metal connecting pins extending substantially parallel to said sidewall and projecting from an end face of the casing, the other ends of which pins are electrically connected to a circuit element, particularly an electrolytic capacitor arranged in a recess of the casing open on one side of the casing remote from the end face having the projecting pin portions.

In a known construction of such a component, the circuit element being an electrolytic capacitor, the opening of the recess in the synthetic resin casing is covered by a closing plate coated with a cast mass in which the bent-over ends of the connecting pins connected to the electrodes of the capacitor are embedded. This construction has the disadvantage that the closure is not always complete for the electrolyte and that the properties of the sealing mass have to match the electrolyte of the capacitor, which can often not be achieved easily.

The invention has for its object to provide an electric-component of the kind set forth, by which said disadvantages are largely obviated.

According to the invention the electric component is characterised in that the recess accommodating the circuit element is covered by the bottom of a unilaterally open box which clamps around the sidewall of the casing.

The component according to the invention can be made in a simple manner from parts that can be manufactured in series production in a simple manner. Moreover, the closure of the recess for the circuit element is reliable so that it may be used in a greater variety of operational conditions.

In a preferred component embodying the invention the sectional area of the casing transverse of the direction of the connecting pins is substantially circular, that is to say, it does not exhibit sharp corners and/or definitely flat parts so that the wall of the box can engage the sidewall of the casing with a given pressure. The outer side of the box may have one or more flat orientation faces which are intended to arrange the parts at their correct positions on printed wiring panels by an automatic process. In accordance with the specific requirements for the part the sealing box may be made of a synthetic resin or of a metal.

In a further preferred embodiment of the invention the circuit element is formed by an electrolytic capacitor comprising an anode, a cathode and a viscous electrolyte, whilst at least the connecting pin with which the anode having a dielectric oxyde film is connected is made of a film-forming metal, preferably of the same metal as the anode over a length portion extending up to the junction with the anode, whereas the other portion of the pin is made of readily solderable metal.

The invention will now be described with reference to the drawing, which shows one embodiment.

Figure 2:
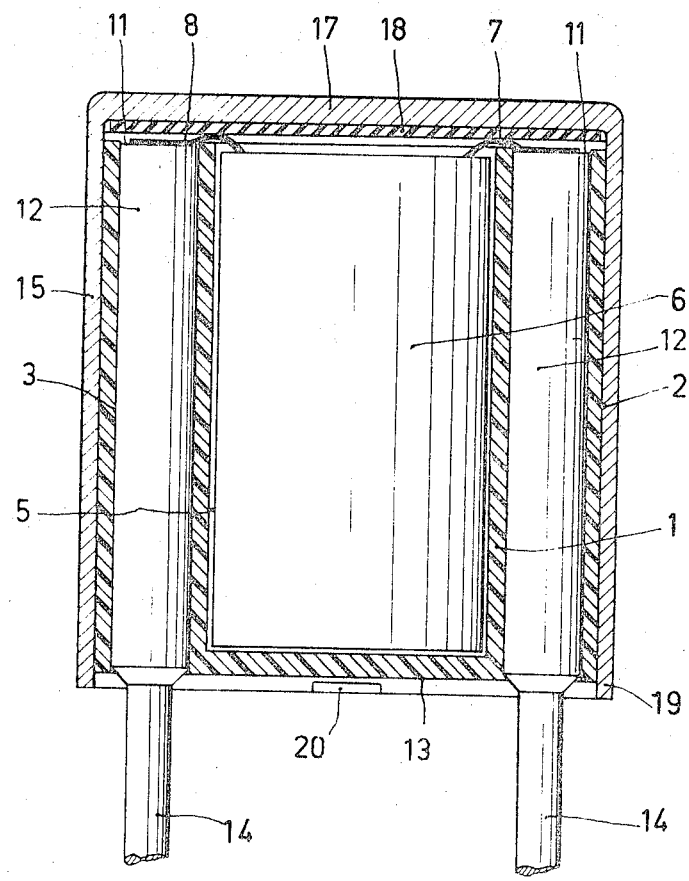

FIG. 1 is an isometric projection of the parts of a component according to the invention, the circuit element being an electrolytic wound capacitor and FIG. 2 is a vertical sectional view of the component of FIG. 1, the plane of the section going through the two connecting pins.

FIG. 1 shows the various parts of the component separately. A cylindrical casing 1 of a synthetic resin, having a substantially elliptical sectional area, comprises two channels 2 and 3 parallel to the sidewall, between which a cavity or a recess 5 is provided, which is open on the upper side 4 of the casing for accomodating the winding 6 of an electrolytic capacitor.

The casing 1 may be made of a thermo-plastic or thermo-hardening synthetic resin, for example, polythene or noryl. With regard to the resistance to the viscous electrolyte in the winding of the capacitor it is preferred to use polypropylene. The winding 6 of the electrolytic capacitor comprises an aluminium anode foil having a connecting tag 7 and an aluminium cathode foil having a connecting tag 8, which is wound together with a spacer impregnated with a viscous electrolyte, for example on glycol basis. The anode foil is provided in a conventional manner with a dielectric oxide film.

Into the channels 2 and 3 are inserted the connecting pins 9 and 10 so that one end face 11 of said pins is substantially flush with the upper face 4 of the casing 1. The pins 9 and 10 consist over a large portion from the end face 11 of aluminium 12, the diameter of said portion matching that of the channels 2 and 3 so that the material of the casing 1 embraces with clamping fit said portions 12 inserted into the channels. The further portions of the pins 9 and 10, particularly the portions projecting beyond the lower face 13 of the casing 1, consist of satisfactorily solderable metal, for example, copper wire 14, which is welded to the aluminium parts 12. The aluminium parts 12 preferably have a length which is substantially equal to the height of the casing 1. The aluminium connecting tags 7 and 8 of the winding 6 are electrically connected, for example, by welding to the end face 11 of each of the connecting pins 9 and 10, lying approximately at the same height. For closing the cavity 5 accommodating the winding 6 and the connections of the tags 7 and 8 with the pins 9 and 10 a box 16 is slipped from above around the casing so that its sidewall 15 clamps around the casing and its bottom 17 arrives approximately at the level of the upper face 4 of the casing. The box 16 may consist of a synthetic resin and in the present case it is made of a metal, in this embodiment aluminium. In order to obtain the required electrical insulation a plate 18 of insulating material, preferably a synthetic resin such as nylon or tetrafluoro-ethylene or a different material not soluble in the electrolyte of the winding 6 is arranged on the bottom 17 inside the box. If the box 16 itself consists of such a material, the additional insulating plate 18 is, of course, not required. The sidewall 15 of the box slipped on the casing 1 has an inner diameter matching the outer diameter of the casing 1, that is to say in this embodiment it is substantially elliptical. The outer periphery of the box 16 may have the same shape, but with a view to the supply of parts by means of automatic setting machines for mounting on plates of printed wiring it is often desired for correct disposition to provide the outer side of the box 16 with one or more flat orientation faces 21. It will be obvious that this can be achieved readily. Boxes of the kind described with or without flat orientation faces can readily be manufactured in large numbers by known techniques, inter alia extrusion.

Owing to the clamping fit of the box 16 around the casing 1 and to the close fit of the pins 9 and 10 in the channels 2 and 3 of the casing the creeping path of the electrolyte of the winding 6 is long before it can emerge from the part. Owing to this creeping path the electrolyte is prevented from drying or evaporating if it contains volatile constituents. In order to obtain a substantially complete seal it is advantageous to fill out any clearance between the inner wall of the box 16 and the outer side of the casing 1 and also any clearance between the pins 9 and 10 and the material of the casing 1 with sealing material which is deformable when the parts concerned are assembled. For this purpose silicone may be used successfully, which may be applied to the co-operating faces prior to the insertion of the pins 9 and 10 and prior to the application of the box 16.

The height of the box 16 slightly exceeds that of the casing 1 so that a rim 19 of the box lies by a small part beneath the lower face 13 of the casing. This rim thus forms a stop for the part when mounted on a printed wiring plate. During mounting the solderable ends 14 are inserted into perforations of the plate and then soldered to the wiring. The relative distance between the ends 14 matches the pitch commonly used in printed wiring.

In order to avoid the formation of a troublesome air cushion, when the part described is mounted to a printed wiring panel, in the space enclosed by the projecting rim 19 of the box 16, said rim is provided with one or more venting recesses 20.

In the embdoiment described above, in which the casing accommodates the winding 6, the portions 12 of the two connecting pins 9 and 10, clamped tight in the casing, are made of aluminium. In order to avoid corrosion by the electrolyte of the winding 6 it is strictly required for the pin 9 at which the connecting tag 7 of the anode foil is fastened to consist of the same material as the anode and the connecting tag. For the sake of simplicity the two pin portions 12 to be connected to the circuit element are of the same material in the present case.

The circuit element accommodated in the recess 5 may as an alternative be a different type of electrolytic capacitor, for example, comprising electrodes of tantalum with a dielectric oxide film.

Though not required in the first place for sealing purposes, the construction described above may successfully be employed for accommodating a different circuit element than an electrolytic capacitor, on the one hand because of its simplicity and on the other hand for reasons of easy manufacture of the parts in series production. The recess 5 may be employed quite satisfactorily for accommodating circuit elements not containing liquid or viscous material liable to leak away or evaporate, for example, resistors, inductors and active circuit elements or assemblies thereof. The recess 5 may accommodate, for example, an integrated circuit of transistors and other active elements and passive elements embedded in a mass.

In connection with the foregoing it will be obvious that more than two connecting pins may be embedded in the material of the casing around the recess 5 accommodating the circuit element or the integrated circuit if this is required for the electric contact with the circuit element or the circuit.

What is claimed is:

1. An electrical apparatus for mounting on printed wiring, said apparatus comprising a synthetic resin casing, a sidewall of said casing having metal connecting pins extending substantially parallel to said sidewall and with end portions projecting from an end face of the casing, said casing having a recess open on the side remote from the end face of the projecting pin portions, an electrical component disposed in said recess and the other ends of said pins electrically connected to the terminals of said component, a box, open at one end, enclosing said casing with the bottom thereof covering said recess and the side wall clamping around the sides of said casing.

2. An electrical apparatus as claimed in claim 1 wherein the sectional area of the casing in transverse to the direction of the connecting pins is substantially circular.

3. An electrical apparatus as claimed in claim 1 wherein the covering box is made of metal.

4. An electrical apparatus as claimed in claim 1 wherein the sidewall of the box extends beyond the end face of the casing having the projecting pin portions and is provided at said plane with one or more recesses.

5. An electrical apparatus as claimed in claim 1 wherein any clearance between a connecting pin and the casing is filled with sealing material.

6. An electrical apparatus as claimed in claim 1 wherein the clearance between the sidewall of the casing and the sidewall of the box is filled with sealing material.

7. An electrical apparatus as claimed in claim 5 wherein the sealing is formed by silicone grease fat.

8. An electrical apparatus as claimed in claim 1 wherein the component consist of an electrolytic capacitor having an anode, a cathode and a viscous electrolyte, and wherein at least the connecting pin, with which the anode having a dielectric oxide film is connected, is made of a film-forming metal over the portion extending in length up to the junction with the anode, and wherein the further pin portion is made of a readily solderable metal.

9. An electrical apparatus as claimed in claim 1 wherein the casing is made of polypropylene.

References Cited
UNITED STATES PATENTS

| | | | |
|---|---|---|---|
| 2,829,426 | 4/1958 | Franklin | 317—101X |
| 3,046,452 | 7/1962 | Gellert | 317—101 |
| 3,239,595 | 3/1966 | Reese et al. | 174—52 |
| 3,396,315 | 8/1968 | Stokes | 317—230 |

JAMES D. KALLAM, Primary Examiner

U.S. Cl. X.R.

317—101, 242